US007068324B2

(12) United States Patent
Englert

(10) Patent No.: US 7,068,324 B2
(45) Date of Patent: Jun. 27, 2006

(54) SYSTEM FOR DISPLAYING GRAPHICS IN A DIGITAL TELEVISION RECEIVER

(75) Inventor: Ulrich Englert, Munich (DE)

(73) Assignee: Micronas GmbH, Freiburg (DE)

(*) Notice: Subject to any disclaimer, the term of this patent is extended or adjusted under 35 U.S.C. 154(b) by 370 days.

(21) Appl. No.: 10/181,399

(22) PCT Filed: Jan. 8, 2001

(86) PCT No.: PCT/EP01/00131

§ 371 (c)(1),
(2), (4) Date: Oct. 15, 2002

(87) PCT Pub. No.: WO01/52551

PCT Pub. Date: Jul. 19, 2001

(65) Prior Publication Data

US 2003/0174251 A1    Sep. 18, 2003

(30) Foreign Application Priority Data

Jan. 14, 2000  (DE) ............................... 100 01 369

(51) Int. Cl.
*H04N 9/74* (2006.01)
*H04N 5/445* (2006.01)
(52) U.S. Cl. .................... 348/589; 348/564; 348/600
(58) Field of Classification Search ............. 348/589, 348/569, 563, 564, 565, 566, 590, 591, 598, 348/599, 600, 584, 554; H04N 9/74, 9/76, H04N 5/445, 5/45
See application file for complete search history.

(56) References Cited

U.S. PATENT DOCUMENTS 5,489,947 A    2/1996  Cooper ................... 348/589

(Continued)

FOREIGN PATENT DOCUMENTS

EP           0422729         4/1991

(Continued)

OTHER PUBLICATIONS

R. Geppert et al. "A Digital Video Encoder for DBS Systems," Proceedings of the International Conference on Consumer Electronics, IEEE, vol. Conf. 12, p. 254-255.

*Primary Examiner*—Sherrie Hsia
(74) *Attorney, Agent, or Firm*—O'Shea, Getz & Kosakowski, P.C.

(57) ABSTRACT

A circuit for displaying graphics in a digital television receiver includes an MPEG decoder which has as input a video data stream in digital format, a central memory for storing decoded video data and graphics data, a video output unit and a graphics output unit to which video data and graphics data, respectively, are fed from the central memory, a mixer to which an output signal from the video output unit is fed, and a switch through which the output signal of the graphics output unit is selectively fed to the mixer. Horizontal and vertical synchronization signals from the MPEG decoder may be fed to the video output unit, while horizontal and vertical synchronization signals from various sources (including those from the MPEG decoder) may be selectively fed through a multiplexer to the graphics output unit. One buffer memory each may be placed before the video output unit and the graphics output unit, respectively, each memory unit buffering the corresponding data retrieved from the central memory. A signal generator may be provided which generates horizontal and vertical synchronization signals and provides these to the multiplexer. Additional horizontal and vertical synchronization signals may be fed to the multiplexer from an external connector. The video output unit may be operated at a first clock frequency, while the graphics output unit may be operated at a second clock frequency. This helps to achieve essentially independent processing of the graphics data and the video data. When the switch is closed, the first and second clock frequencies may be the same, and the same horizontal and vertical synchronization signals may then be sent to both the video output unit and the graphics output unit.

19 Claims, 2 Drawing Sheets

U.S. PATENT DOCUMENTS

| | | | |
|---|---|---|---|
| 5,534,942 A | 7/1996 | Beyers, Jr. et al. | 348/569 |
| 5,969,770 A | 10/1999 | Horton | 348/569 |
| 6,573,946 B1 * | 6/2003 | Gryskiewicz | 348/600 |
| 6,664,970 B1 * | 12/2003 | Matsushita | 348/589 |
| 6,707,505 B1 * | 3/2004 | Kuo et al. | 348/589 |

FOREIGN PATENT DOCUMENTS

| | | |
|---|---|---|
| WO | WO 96/18991 | 6/1996 |
| WO | WO 96/19077 | 6/1996 |
| WO | WO 99/23831 | 5/1999 |

* cited by examiner

SYSTEM FOR DISPLAYING GRAPHICS IN A DIGITAL TELEVISION RECEIVER

PRIORITY INFORMATION

This application claims priority from International patent application PCT/EP01/00131 filed Jan. 8, 2001 and German patent application DE 100 01 369.4 filed Jan. 14, 2000.

BACKGROUND OF THE INVENTION

The invention relates in general to the field of digital television, and in particular to a circuit for displaying graphics data along with video data in a digital television receiver.

Highly-integrated chip sets including a digital TV decoder are available for digital television sets. The digital TV decoder typically has an MPEG video decoder, a unit for outputting decoded video data, and an on screen display (OSD) unit. The OSD unit has the function, for example, of displaying settings for the television set such as volume, color, contrast, brightness, etc. on the screen, but may be used to display any type of information such as data from the Internet. The OSD unit retrieves the graphics data in the same synchronization raster and pixel raster as the video data from a memory, which stores both video data and graphics data, and displays the graphics data on the television screen.

If, on the other hand, an application requires independent output of graphics and video data, complex circuits typically must be provided since, for example, in a 100 Hz television receiver, graphics data do not pass through an algorithm for raising the refresh rate to 100 Hz, as this would be superfluous. Problems may also occur in applications, for example, in which decoded digital video data for recording are fed to an analog video recorder in the background. In this case, the video and/or graphics data are displayed by the television receiver, while the analog video recorder records the video data. Currently, no integrated chip set is available for such applications.

What is needed is a system for displaying graphics in a digital television receiver which avoids the above problems.

SUMMARY OF THE INVENTION

A method for displaying graphics, for example in a digital television receiver, includes the steps where a data stream is provided which has video data in digital format, a first YUV signal with a frequency raster is generated in digital format from the video data, the first YUV signal is converted to a YUV signal with a frequency raster in analog format, an RGB signal is provided with a frequency raster in analog format, which RGB signal contains graphics data, and a mixing signal is provided by which the second YUV signal and the RGB signal are mixed together.

Advantageously, conversion of the RGB signal or graphics data to a different frequency raster may be avoided. In addition, the method allows for essentially independent processing of the YUV signal and the RGB signal, or of the video data and graphics data, a feature which is typically required for special applications such as web applications with graphics data and simultaneous transfer of decoded video data for recording by an analog video recorder in the background.

An MPEG decoder may receive the data stream with the video data in digital format and generate from it the first YUV signal. The MPEG decoder may also generate the RGB signal and the mixing signal. The MPEG decoder may also provide the YUV signal at a CCIR656 connector in a 50 Hz frequency raster. A conventional converter may be connected to the CCIR656 connector for further processing, whereby the converter for example converts the first YUV signal in digital format to the second YUV signal in analog format. Specifically, the converter may convert the first YUV signal to the second YUV signal in the 100 Hz frequency raster. Such converters are inexpensive and readily available as standard components.

The frequency raster of the RGB signal may be 100 Hz since the 100 Hz television equipment with digital signal processing has become the standard for the television receiver market. The graphics data may have twice the resolution of the video data. Since the graphics data include mainly stationary images and not moving images as do video data, the resolution of the graphics data in general may be twice that of the video data to achieve a fine, high-resolution rendition of the graphics data.

A circuit for displaying graphics on a digital receiver includes an MPEG decoder to which a data stream is fed which includes video data in digital format, a central memory for storing decoded video data and graphics data and which is readable and writable by the MPEG decoder, a video output unit and a graphics output unit to which video data and graphics data, respectively, are fed from the central memory, a mixer to which an output signal from the video output unit is fed and an output signal from the graphics output unit is selectively fed, and a switch through which the output signal of the graphics output unit is selectively fed to the mixer.

A circuit of this type may be easily made in the form of an integrated circuit or chip or chip set. Horizontal and vertical synchronization signals from the MPEG decoder may be fed to the video output unit, while horizontal and vertical synchronization signals from different sources (including those from the MPEG decoder) may be selectively fed through a multiplexer to the graphics output unit. One buffer memory each may be placed before the video output unit and the graphics output unit, respectively, each memory unit buffering the corresponding data retrieved from the central memory. A signal generator may be provided which generates horizontal and vertical synchronization signals and provides these to the multiplexer. Additional horizontal and vertical synchronization signals may be fed to the multiplexer from an external connector, for example, through a SCART connector. The video output unit may be operated at a first clock frequency, while the graphics output unit may be operated at a second clock frequency. This helps to achieve essentially independent processing of the graphics data and the video data.

When the switch is closed, the first and second clock frequencies may be the same, and the same horizontal and vertical synchronization signals may then be sent to both the video output unit and the graphics output unit.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
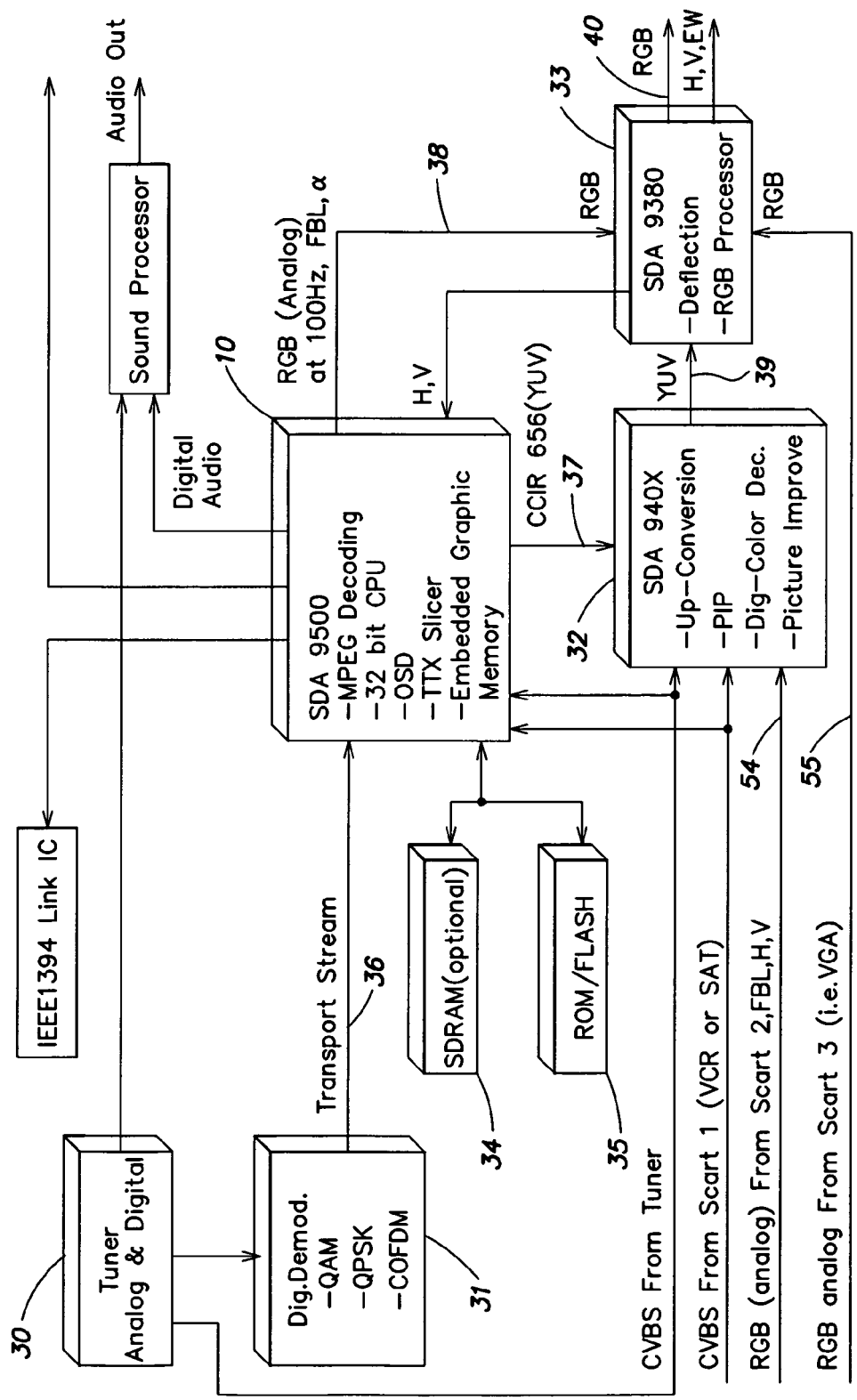
FIG. 1 illustrates an embodiment of a system for displaying graphics data and video data in a digital television receiver.

Referring to FIG. 1, a system for displaying graphics data and video data in a digital television receiver includes an MPEG decoder 10 (for example component SDA 9500) to which a digital data stream 36 is fed from a digital demodulator 31 which demodulates signals modulated by one of the modulation methods QAM, QPSK or COFDM. The digital demodulator 31 receives digital signals from an analog and digital tuner 30 which receives analog and/or digital television signals.

The MPEG decoder 10 decodes from the supplied data stream 36 a digital YUV signal 37 and provides this signal on the line 37 in 50 Hz format to a CCIR656 output of the decoder 10 in the form of digital data. The digital data typically include horizontal, vertical, and synchronization components, as well as a sampling rate of 27 MHz. The YUV signal on the line 37 in 50 Hz format represented by the digital data is up-converted by a converter 32 (for example component SDA 940x) to the 100 Hz format and is available as the converted YUV analog signal on a line 39 at one output of the converter 32.

To accomplish these tasks, the MPEG decoder 10 may have a 32-bit processor core and a graphics memory. In addition, the MPEG decoder 10 may have OSD units to process the on screen display unit signal data or graphics data, along with a TTX slicer.

The MPEG decoder 10 also provides an analog RGB signal on a line 38 with graphics data at twice the video resolution, and provides an additional mixing signal α, to mix together the RGB signal on the line 38 and the converted YUV analog signal on a line 39. The MPEG decoder 10 may retrieve the graphics data from an SDRAM (synchronous DRAM) 34 and/or from a ROM/flash 35 in which the data are stored. Mixing may occur in an analog RGB processor 33 which synchronizes the graphics data to the horizontal and vertical components.

In addition, a first external analog RGB signal 54 may be fed to the converter 32, for example through a SCART connector. The supplied RGB signal on the line 54 may then be converted to the 100 Hz format for display on the television screen.

The converted YUV analog signal on the line 39 may be mixed in the analog RGB processor 33 with the RGB signal 38 and, in certain cases, with the mixing signal α. A synchronized RGB signal on a line 40 in 100 Hz format may be available at an output of the analog RGB processor 33, and the RGB signal 40 may be displayed on the screen of a television.

A second external analog RGB signal on a line 55 may, for example, additionally be fed through a SCART input to the analog RGB processor 33 and mixed by the RGB processor 33 with the YUV analog signal on the line 39 and the analog RGB signal on the line 38. The second external analog RGB signal on the line 55 may, for example, be a VGA signal from a computer containing computer data for display on a television receiver.

The converter 32 may also receive a CVBS signal from the analog and digital tuner 30, or from a SCART connector, and convert it to the 100 Hz format. This feature may be used for example to insert a Picture in Picture (PIP) if the analog and digital tuner 30 is able to receive in parallel on two different frequencies. Alternatively, a signal fed through the SCART connector, such as a signal from a video recorder, may be displayed as a Picture in Picture. The converter 32 may also have the function of image enhancement or digital color decimation.

Figure 2:
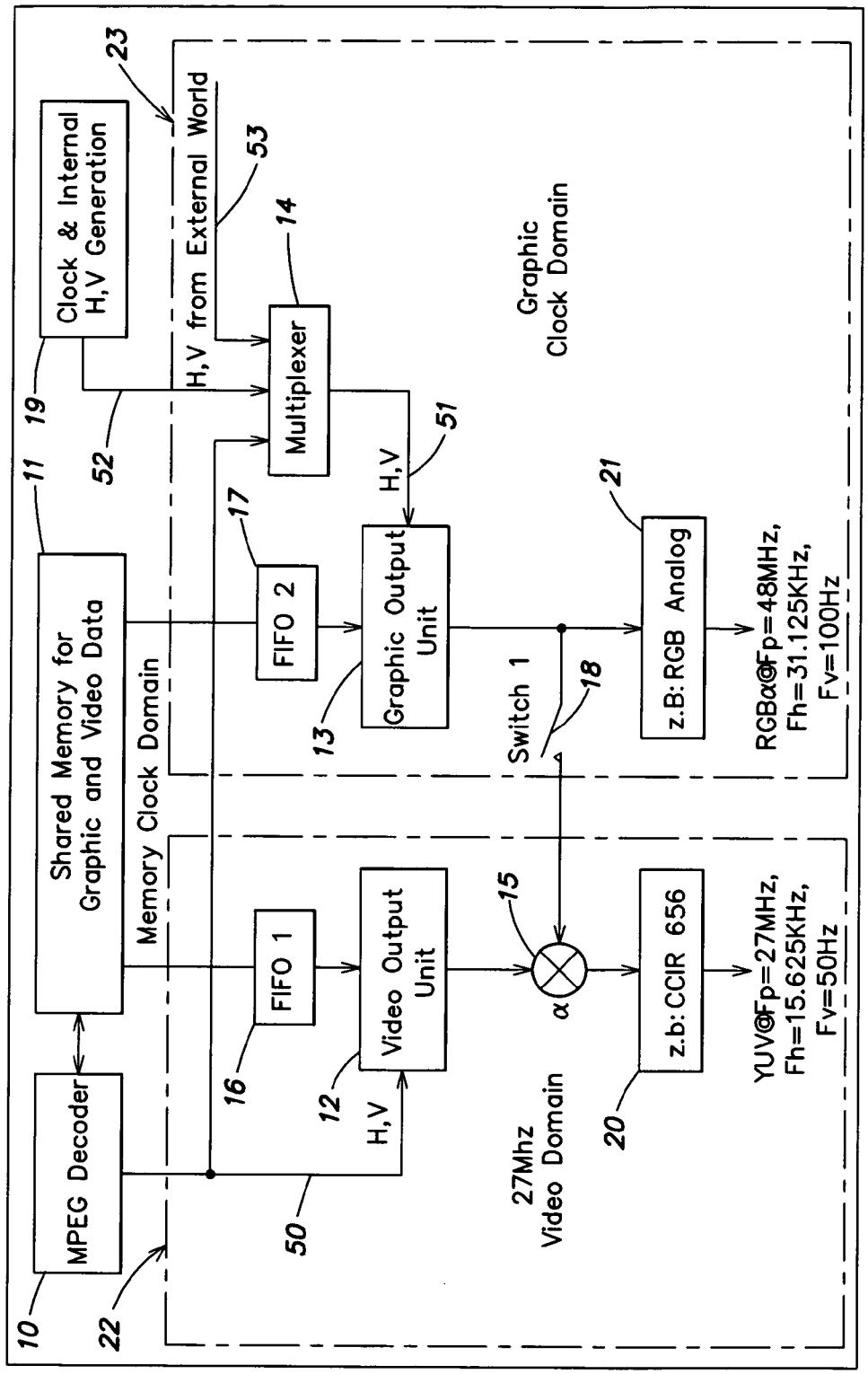
FIG. 2 illustrates another embodiment of a system for displaying graphics data and video data in a digital television receiver.

Referring to FIG. 2, a system for separate processing of video and graphics data includes an MPEG decoder 10 that is connected bi-directionally with a central memory 11. The central memory 11 may be integrated on one chip as embedded memory together with the MPEG decoder 10. Graphics and video data may be stored in the central memory 11 for display by a television receiver. The MPEG decoder 10 writes and reads video and graphics data to/from the central memory 11. Both the MPEG decoder 10 and the central memory 11 may be operated at a clock frequency of 108 MHz which is four times the 27 MHz sampling frequency of a video signal.

A video unit 22 may process the video data and a graphics unit 23 may process the graphics data. Processing of the graphics and video data thus occurs essentially in separate units 22, 23.

The video unit 22 may have a FIFO buffer memory 16 for intermediate storage of the video data retrieved from the central memory 11. A video output unit 12 is connected to the buffer memory 16, where the video output unit 12 processes the video data for display on a television screen. For this purpose, the video output unit 12 receives horizontal and vertical synchronization signals 50 from the MPEG decoder 10.

The graphics unit 23 also has a FIFO buffer memory 17 for intermediate storage of graphics data retrieved from the central memory 11. A graphics output unit 13 is connected to the buffer memory 17, where the graphics output unit 23 processes the graphics data for display on a television screen. For this purpose, the graphics output unit 13, similar to the video output unit 12, receives horizontal and vertical synchronization signals on a line 51 from a multiplexer 14. The inputs of the multiplexer 14 include the horizontal and vertical synchronization signals on the line 50 from the MPEG decoder 10, horizontal and vertical synchronization signals on a line 52 from an internal signal generator 19, and horizontal and vertical synchronization signals on a line 53 from an external source. The horizontal and vertical synchronization signals on the line 51 provided to the graphic output unit 13 may be selected through the multiplexer 14.

The video unit 22 has a mixer 15 following the video output unit 12 and a CCIR656 connector 20 following the mixer 15. A digital YUV signal may be applied at the CCIR656 connector 20 which is to be converted by a converter to the 100 Hz format. In the graphics unit 23, an analog RGB connector 21 is connected after the graphics output unit 13, through which the RGB connector 21 an RGB signal is output containing the graphics data.

The output signal of the graphics output unit 13 may additionally be coupled through a switch 18 to another input of the mixer 15 in the video unit 22. The output signal of the graphics output unit 13 may be mixed together with the output signal of the video output unit 12 by the mixer 15. For this purpose, an additional video/graphics mixing factor α is taken into account which may be generated by the graphics unit 23.

The switch 18 enables the system to operate in either one of two modes. When the switch 18 is closed, the system operates in a synchronous graphics mode in which the video output unit 12 and the graphics output unit 13 receive the same horizontal and vertical synchronization signals from the MPEG decoder 10. Video/graphics mixing factor α is generated by the graphics unit 23. The graphics data and the video data are digitally mixed together.

On the other hand, when the switch 18 is open, this is the asynchronous graphics mode since the graphics unit 23 and the video unit 22 are essentially operating independently of one another. The graphics unit 23 may work at any clock frequency independent of the clock frequency of the video unit 22. The data flow from the central memory 11 for the graphics display unit 13 is buffered through the buffer memory 17. For this purpose, the buffer memory 17 receives the clock of the central memory 11 as the write clock and the pixel output clock as the read clock. The horizontal and vertical synchronization signals may be derived either from the signal generator 19 internally, for example through counters from the system clock, or from an external source such as a deflection unit. In this mode, the graphics unit 23 may feed its data essentially independently from the video unit 22 in almost any sampling raster to another component which, based on video/graphics mixing factor α, mixes together in analog form the output signal from the CCIR656 connector 20 of the graphics unit 22 and the output signal from the analog RGB connector 21 of the graphics unit 23.

Although the present invention has been shown and described with respect to several preferred embodiments thereof, various changes, omissions and additions to the form and detail thereof, may be made therein, without departing from the spirit and scope of the invention.

What is claimed is:

1. A system for displaying graphics data and video data in a digital television receiver, comprising:
    a decoder that decodes an input video data stream and provides decoded video data;
    a memory that stores the decoded video data and graphics data;
    a video output unit that processes the stored decoded video data for display on the digital television receiver, where the video output unit receives a first set of synchronization signals;
    a graphics output unit that processes the stored graphics data for display on the digital television receiver, and where the graphics output unit receives a second set of synchronization signals;
    a mixer that receives an output signal from the video output unit; and
    a switch that selectively provides an output signal from the graphics output unit to the mixer;
    where when the switch is closed the switch provides the output signal from the graphics output unit to the mixer and the mixer mixes the output signal from the video output unit with the output signal from the graphics output unit, and when the switch is open the mixer provides the output signal from the video output unit.

2. The system of claim 1, where the input data stream is in digital format and includes video data.

3. The system of claim 1, where the decoder comprises an MPEG digital data decoder.

4. The system of claim 3, where the MPEG decoder provides the first set of synchronization signals to the video output unit.

5. The system of claim 1, further comprising a multiplexer the receives the first and second sets of synchronization signals, and provides a selected one of the first and second sets of synchronization signals to the graphics output unit.

6. The system of claim 5, where when the switch is closed the first set of synchronization signals are selected by the multiplexer to be provided to the graphics output unit.

7. The system of claim 5, where each of the first and second sets of synchronization signals comprise horizontal and vertical synchronization signals.

8. The system of claim 5, further comprising a signal generator that generates a set of horizontal and vertical synchronization signals and provides this set of horizontal and vertical synchronization signals to the multiplexer.

9. The system of claim 5, further comprising a set of horizontal and vertical synchronization signals that are provided from an external source to the multiplexer.

10. A circuit for displaying graphics in a digital television receiver, comprising:
    an MPEG decoder that decodes an input data stream that includes video data in digital format and provides decoded video data;
    a central memory that stores both the decoded video data and graphics data, where the central memory is readable and writable by the MPEG decoder;
    a video output unit that receives the stored decoded video data from the central memory, where the video output unit processes the stored decoded video data for display on the digital television receiver and provides a corresponding output signal, and where the video output unit receives a first set of horizontal and vertical synchronization signals;
    a graphics output unit that receives the stored graphics data from the central memory, where the graphics output unit processes the stored graphics data for display on the digital television receiver and provides a corresponding output signal, and where the graphics output unit receives a second set of horizontal and vertical synchronization signals;
    a mixer that receives the output signal from the video output unit; and
    a switch that selectively provides the output signal from the graphics output unit to the mixer;
    where when the switch is closed the switch provides the output signal from the graphics output unit to the mixer, and the mixer mixes the output signal from the video output unit with the output signal from the graphics output unit; and
    where when the switch is open the mixer provides the output signal from the video output unit.

11. The circuit of claim 10, where the MPEG decoder provides the first set of horizontal and vertical synchronization signals to the video output unit.

12. The circuit of claim 10, further comprising a multiplexer that receives the first and second sets of horizontal and vertical synchronization signals to the multiplexer, and provides a selected one of the first and second sets of horizontal and vertical synchronization signals to the graphics output unit.

13. The circuit of claim 12, further comprising a signal generator that generates a set of horizontal and vertical synchronization signals and provides this set of horizontal and vertical synchronization signals to an input of the multiplexer.

14. The circuit of claim 12, further comprising a set of horizontal and vertical synchronization signals that are provided from an external source to an input of the multiplexer.

15. The circuit of claim 12, where when the switch is closed the first set of horizontal and vertical synchronization signals are selected by the multiplexer to be provided to the graphics output unit.

16. The circuit of claim 12, where when the switch is open the multiplexer selects a set of horizontal and vertical synchronization signals to be provided to the graphics output unit that is different than the first set of horizontal and vertical synchronization signals.

17. The circuit of claim 10, further comprising a first buffer memory connected between the central memory and the video output unit, where the first buffer memory buffers the stored decoded video data, and further comprising a second buffer memory connected between the central memory and the graphics output unit, where the second buffer memory buffers the stored graphics data.

18. The circuit of claim 10, where the video output unit is operated at a first clock frequency, and the graphics output unit is operated at a second clock frequency.

19. The circuit of claim 18, where when the switch is closed, the first and second clock frequencies are the same.

* * * * *

UNITED STATES PATENT AND TRADEMARK OFFICE
CERTIFICATE OF CORRECTION

| | | |
|---|---|---|
| PATENT NO. | : 7,068,324 B2 | Page 1 of 1 |
| APPLICATION NO. | : 10/181399 | |
| DATED | : June 27, 2006 | |
| INVENTOR(S) | : Ulrich Englert | |

It is certified that error appears in the above-identified patent and that said Letters Patent is hereby corrected as shown below:

<u>Column 5,</u> claim 5, line 62, before "receives" delete "the" and insert --that--

Signed and Sealed this

Twenty-second Day of August, 2006

JON W. DUDAS
*Director of the United States Patent and Trademark Office*